United States Patent
Kohn

[15] 3,699,163
[45] Oct. 17, 1972

[54] N-SUBSTITUTED CARBAMOYL CHLORIDES AND METHOD OF PREPARATION

[72] Inventor: Gustave K. Kohn, Berkeley, Calif.

[73] Assignee: Chevron Research Company, San Francisco, Calif.

[22] Filed: June 12, 1970

[21] Appl. No.: 45,901

[52] U.S. Cl.................260/544 C, 71/120, 424/322, 260/553 A
[51] Int. Cl........................C07c 51/58, C07c 53/30
[58] Field of Search...................................260/544 C

[56] References Cited

UNITED STATES PATENTS 3,282,950    11/1966    Ottman...................260/306.7

*Primary Examiner*—Lorraine A. Weinberger
*Assistant Examiner*—Richard D. Kelly
*Attorney*—J. A. Buchanan, John Stoner, Jr., G. F. Magdeburger and Raymond Owyang

[57] ABSTRACT

N-alkyl-N-chlorothiocarbamoyl chlorides and their method of preparation by reacting alkyl isocyanates with sulfur dichloride. The carbamoyl chlorides are useful intermediates in the preparation of pesticides.

8 Claims, No Drawings

N-SUBSTITUTED CARBAMOYL CHLORIDES AND METHOD OF PREPARATION

FIELD OF THE INVENTION

The present invention is directed to N-alkyl-N-chlorothiocarbamoyl chlorides and their method of preparation. The carbamoyl chlorides are useful as intermediates in the preparation of pesticides.

DESCRIPTION OF THE INVENTION

The carbamoyl chlorides of the present invention may be represented by the formula:

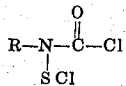

wherein R is alkyl of from one to 10 carbon atoms, alkyl of from one to 10 carbon atoms substituted with halogen atoms of atomic number 17 to 35 (chlorine and bromine), cycloalkyl of five to 10 carbon atoms or cycloalkyl of five to 10 carbon atoms substituted with halogen atoms of atomic number 17 to 35; preferably the haloalkyl radical or halocycloalkyl radical will contain one – four halogen substituents, preferably one – two halogen substituents.

More preferably R is alkyl of one to six carbon atoms, alkyl of one to six carbon atoms substituted with one to four halogen atoms of atomic number 17 to 35, preferably one to two halogen atoms of atomic number 17 to 35, cycloalkyl of five to six carbon atoms or cycloalkyl of five to six carbon atoms substituted with one to four halogen atoms of atomic number 17 to 35, preferably one to two halogen atoms of atomic number 17 to 35.

Still more preferably R is alkyl of one to four carbon atoms or alkyl of one to four carbon atoms substituted with one to two halogen atoms of atomic number 17 to 35.

Examples of representative R groups include: methyl, ethyl, n-propyl, isopropyl, n-butyl, isobutyl, pentyl, hexyl, heptyl, octyl, nonyl, decyl, 2-methylbutyl, 3-methylpentyl, chloromethyl, bromomethyl, 1,2-dichloroethyl, cyclopentyl, cyclohexyl, etc.

The carbamoyl chlorides of the present invention are made by the reaction of an isocyanate and SCl₂ in accordance with the following reaction:

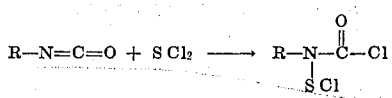

wherein R is the same as defined above. The sulfur dichloride/isocyanate molar ratio should be at least 1:1. The sulfur dichloride is preferably present in excess. For best results it is necessary that the sulfur dichloride be in excess of 95 percent, preferably 99 percent, pure.

The reaction can be accomplished in the presence of a suitable inert organic solvent or neat. Preferably the solvent is low boiling and easily removed by a low temperature stripping operation. Examples of suitable solvents include: dichloromethane, diethylether, tetrahydrofuran and dimethylfuran.

Sufficient solvent is used to dissolve the reactants. In general it is sufficient to use about 25 to 200 ml. of solvent for each 0.1 mole isocyanate. Preferably 50 to 100 ml. is used.

The reaction of the isocyanate and sulfur dichloride can be accomplished in the presence of a suitable catalyst, such as for example dibutyl tin dilaureate, tetraethyl ammonium chloride and triethylamine. The preferred catalyst is tetraethyl ammonium chloride. Although the reaction will also proceed without the presence of a catalyst, a catalyst is preferred. Generally about 1 percent to 50 percent by weight of catalyst based on isocyanate is sufficient. Preferably the catalyst is removed before isolation of the carbamoyl chloride product or before in situ reaction with a suitable reactant to produce the insecticidal product described further hereinafter.

The reaction is preferably accomplished at a temperature of from −50° to 100°C. and at ambient or autogenous pressure. The reaction time will generally run from ¼ to 72 hours, more usually ⅛ to 24 hours.

The carbamoyl chloride product can be recovered by stripping sulfur dichloride and then distilling the desired product from the mixture. When the catalyst is insoluble, the carbamoyl chloride product can be recovered by stripping sulfur dichloride, filtering the insoluble catalyst and then evaporating off the low boiling solvent.

Examples of suitable carbamoyl chlorides prepared by the subject reaction include: N-methyl-N-chlorothiocarbamoyl chloride, N-ethyl-N-chlorothiocarbamoyl chloride, N-n-propyl-N-chlorothiocarbamoyl chloride, N-n-butyl-N-chlorothiocarbamoyl chloride, N-isopropyl-N-chlorothiocarbamoyl chloride, N-n-pentyl-N-chlorothiocarbamoyl chloride, N-chloromethyl-N-chlorothiocarbamoyl chloride, N-bromo-methyl-N-chlorothiocarbamoyl chloride, N-cyclopentyl-N-chlorothiocarbamoyl chloride, N-cyclohexyl-N-chlorothiocarbamoyl chloride, N-halocyclohexyl-N-chlorothiocarbamoyl chloride.

The compounds of the present invention are useful intermediates in the preparation of pesticides. Thus the carbamoyl chlorides of the present invention may be used to produce N-alkyl-N-(chlorocycloalkylthio) ureas which have pesticide, particularly herbicide activity. These compounds are prepared by the reaction of N-alkyl-N-chlorothiocarbamoyl chloride with a cyclic unsaturated hydrocarbon and then with ammonia or an amine. Thus, e.g., N-methyl-N-(2-chlorocyclohexylthio)-N'-phenyl urea can be prepared by reacting N-methyl-N-chlorothiocarbamoyl chloride of the present invention with cyclohexene and the resulting product reacted with aniline in accordance with the following general reaction scheme:

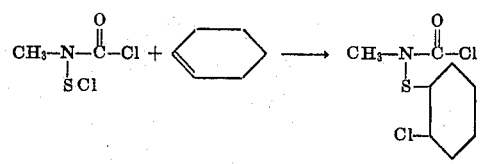

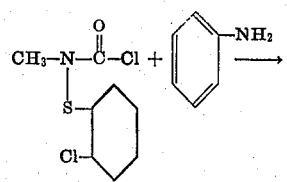

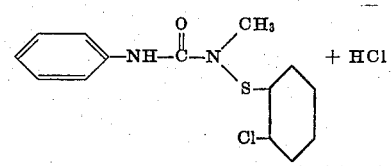

The present invention will be more fully understood by reference to the following examples.

EXAMPLE 1

14.3 g. of methyl isocyanate (molecular weight 57.05) and 5 g. of tetraethyl ammonium chloride were dissolved in 100 ml. of dichloromethane. Sulfur dichloride (25.8 g.) of greater than 98% purity was added dropwise. The reaction was slightly exothermic. The reaction mixture turned yellow within about 15 minutes. The dichloromethane was evaporated and the product separated from the tetraethyl ammonium chloride salt by hexane extraction. The hexane was then evaporated and the product distilled. The fraction boiling at 32°–35°C/0.2 mm was chemically analyzed for N-methyl-N-chlorothiocarbamoyl chloride:

|   |   | Calculated | Found |
|---|---|---|---|
| N | % | 8.75  | 8.12  |
| Cl| % | 44.31 | 44.18 |
| S | % | 20.04 | 19.68 |

Infrared analysis and proton magnetic resonance analysis were as used to confirm the structure.

EXAMPLE 2

Methyl isocyanate 11.4 g. (0.2 moles) and sulfur dichloride 52 g. (0.5 moles) of greater than 98 percent purity were mixed neat without a catalyst. The reaction mixture was allowed to stand at ambient temperature for 8 days. The product was stripped of excess sulfur dichloride and distilled. The boiling point was 37°C. at 0.5 mm. pressure. Chemical analysis of the N-methyl-N-chlorothiocarbamoyl chloride gave:

|   |   | Calculated | Found |
|---|---|---|---|
| N | % | 8.75  | 8.34  |
| Cl| % | 44.4  | 45.00 |
| S | % | 20.04 | 19.95 |

EXAMPLE 3

14.3 g. of methyl isocyanate and 25.8 g. of sulfur dichloride were reacted neat without a catalyst and in the absence of light. After 28 days the reaction mixture turned yellow. N-methyl-N-chlorothiocarbamoyl chloride was produced.

EXAMPLE 4

19.8 g. of n-butyl isocyanate and 20.6 g. of sulfur dichloride were put into a vial, neat, in the absence of a catalyst and reacted in the presence of sunlight. The reaction mixture turned yellow. Analysis indicated a formation of N-n-butyl-N-chlorothiocarbamoyl chloride.

EXAMPLE 5

The same reactants as in Example 4 in approximately the same quantities were placed in a pressure tube which was sealed and placed in a boiling water bath for 6 hours. At the end of this period of time the reaction mixture was orange and after standing for about 2 days the product became pale yellow. Analysis of the stripped product indicated N-n-butyl-N-chlorothiocarbamoyl chloride:

|   |   | Calculated | Found |
|---|---|---|---|
| N | % | 6.93  | 6.68  |
| Cl| % | 35.08 | 35.23 |
| S | % | 15.87 | 15.62 |

EXAMPLE 6 n-Butyl isocyanate (19.8 g.) and tetraethyl ammonium chloride (5 g.) were dissolved in 100 ml. of dichloromethane. 20.6 g. of sulfur dichloride was slowly added dropwise. After about 15 minutes the reaction mixture turned yellow. The dichloromethane was evaporated. The product was taken up in hexane and separated from the catalyst. The hexane was then evaporated. N-n-butyl-N-chlorothiocarbamoyl chloride was produced.

Other reactions were carried out in the presence of solvents such as dimethylfuran and tetrahydrofuran, and in the presence of catalysts such as dibutyl tin dilaureate and triethyl-amine.

As will be evident to those skilled in the art, various modifications on this invention can be made or followed, in the light of the foregoing disclosure and discussion, without departing from the spirit or scope of the disclosure or from the scope of the following claims.

I claim:

1. Compound of the formula

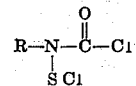

wherein R is alkyl of one to 10 carbon atoms, alkyl of one to 10 carbon atoms substituted with one to four halogen atoms of atomic number 17 to 35, cycloalkyl of five to 10 carbon atoms or cycloalkyl of 5 to 10 carbon atoms substituted with one to four halogen atoms of atomic number 17 to 35.

2. Compound of claim 1 wherein R is alkyl of one to six carbon atoms, alkyl of one to six carbon atoms substituted with one to four halogen atoms of atomic number 17 to 35, cycloalkyl of five to six carbon atoms or cycloalkyl of five to six carbon atoms substituted with one to four halogen atoms of atomic number 17 to 35.

3. Compound of claim 2 wherein R is alkyl of one to six carbon atoms substituted with one to two halogen atoms of atomic number 17 to 35 or cycloalkyl of five to six carbon atoms substituted with one to two halogen atoms of atomic number 17 to 35.

4. Compound of claim 1 wherein R is alkyl of from one to four carbon atoms.

5. Compound of claim 4 wherein R is methyl.

6. Compound of claim 4 wherein R is butyl.

7. Method of preparation of the compound of the formula

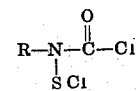

wherein R is alkyl of one to 10 carbon atoms, alkyl of one to 10 carbon atoms substituted with one to four halogen atoms of atomic number 17 to 35, cycloalkyl of five to 10 carbon atoms or cycloalkyl of five to 10 carbon atoms substituted with one to four halogen atoms of atomic number 17 to 35, which comprises reacting an isocyanate of the formula $R - N = C = O$, wherein R is as defined above, with sulfur dichloride in the presence of a catalyst selected from the group consisting of dibutyl tin dilaurate, tetramethyl ammonium chloride and triethylamine, at a temperature of $-50°C$ to $100°C$.

8. The method of claim 7 wherein the catalyst is tetramethyl ammonium chloride.

* * * * *